US012127620B2

(12) United States Patent
Ford

(10) Patent No.: US 12,127,620 B2
(45) Date of Patent: Oct. 29, 2024

(54) LIGHT-EMITTING BEACON

(71) Applicant: 9609385 CANADA INC., Beaconsfield (CA)

(72) Inventor: Timothy D. F. Ford, Beaconsfield (CA)

(73) Assignee: 9609385 CANADA INC., Beaconsfield (CA)

( * ) Notice: Subject to any disclaimer, the term of this patent is extended or adjusted under 35 U.S.C. 154(b) by 37 days.

(21) Appl. No.: 17/248,935

(22) Filed: Feb. 12, 2021

(65) Prior Publication Data

US 2021/0161239 A1 Jun. 3, 2021

Related U.S. Application Data

(63) Continuation of application No. 15/968,173, filed on May 1, 2018, now Pat. No. 10,918,152.

(60) Provisional application No. 62/492,542, filed on May 1, 2017.

(51) Int. Cl.

| | |
|---|---|
| ***A42B 3/04*** | (2006.01) |
| ***F21L 4/00*** | (2006.01) |
| ***F21V 23/04*** | (2006.01) |
| *F21Y 115/10* | (2016.01) |

(52) U.S. Cl.

CPC .............. *A42B 3/0453* (2013.01); *F21L 4/00* (2013.01); *F21V 23/0414* (2013.01); *A42B 3/044* (2013.01); *F21Y 2115/10* (2016.08)

(58) Field of Classification Search

CPC ....... A42B 1/242; A42B 1/244; A42B 3/0433; A42B 3/044; A42B 3/0446; A42B 3/0453; F21W 2111/00; F21W 2111/10; F21L 4/00–085; H04B 10/1123–1127; G01S 17/74; B60Q 1/2676; F21S 9/02

See application file for complete search history.

(56) References Cited

U.S. PATENT DOCUMENTS

| | | | |
|---|---|---|---|
| 5,376,461 A | 12/1994 | Shiraki et al. | |
| 7,264,368 B2 | 9/2007 | Sherring | |
| 9,781,964 B1 * | 10/2017 | Davis | A42B 3/0446 |
| 2004/0130888 A1 | 7/2004 | Twardawski | |
| 2006/0133068 A1 | 6/2006 | Sherring | |
| 2007/0081352 A1 | 4/2007 | Yamamoto | |
| 2011/0069476 A1 * | 3/2011 | Lombard | F21V 23/0435 362/105 |

(Continued)

*Primary Examiner* — Jia X Pan
*Assistant Examiner* — Steven Y Horikoshi
(74) *Attorney, Agent, or Firm* — Lavery, de Billy LLP; Hugh Mansfield

(57) ABSTRACT

A light-emitting beacon comprising a printed circuit board assembly arranged between a carapace and a battery such that a first surface of the assembly faces the battery and a second surface of the assembly faces the carapace is disclosed. The circuit board assembly comprises LEDs arranged on the second surface wherein a first of the LEDs emits a first light visible from a first lateral side of the carapace and a second of the LEDs emits a second light visible from a second lateral side of the carapace. There is also disclosed a beacon comprising an LED activated in response to light sensed by at least one of a plurality of photosensors arranged on the second outer surface. One of the photosensors senses light shining on a first lateral side of the carapace and another of the photosensors senses light shining on a second lateral side of the carapace.

18 Claims, 6 Drawing Sheets

(56) References Cited

U.S. PATENT DOCUMENTS

| | | | | |
|---|---|---|---|---|
| 2012/0105224 | A1 | 5/2012 | Ford | |
| 2014/0062660 | A1 | 3/2014 | Secord et al. | |
| 2015/0062886 | A1 | 3/2015 | Leegate et al. | |
| 2015/0204523 | A1 | 7/2015 | Nieminen | |
| 2015/0272252 | A1* | 10/2015 | Munns | A42B 1/244<br>362/183 |
| 2016/0271458 | A1 | 9/2016 | Lin | |
| 2016/0355048 | A1* | 12/2016 | Alzhrany | B43K 24/06 |
| 2017/0071279 | A1* | 3/2017 | Zimmer | A42B 3/0453 |
| 2017/0122538 | A1* | 5/2017 | Swan | F21L 4/02 |

* cited by examiner

LIGHT-EMITTING BEACON

CROSS-REFERENCE TO RELATED APPLICATIONS

This application is a Continuation of U.S. patent application Ser. No. 15/968,173, filed on May 1, 2018, now U.S. Pat. No. 10,918,152. U.S. patent application Ser. No. 15/968,173 also claims priority of a commonly assigned U.S. provisional application assigned the Ser. No. 62/492,542 filed on May 1, 2017. All documents above are incorporated herein in their entirely by reference.

FIELD OF THE INVENTION

The present invention relates to a light-emitting beacon. More specifically, the present invention is concerned with a beacon for mounting on a helmet.

BACKGROUND OF THE INVENTION

Small portable light emitting beacons are used to identify people and objects in a variety of applications, in particular in identify friend-or-foe (IFF) applications where distinguishing between friendlies and adversaries quickly and correctly plays an important role both strategically and for increased safety. In some applications light-emitting beacons are mounted onto helmets or the like. On drawback of these beacons is that as the beacons are not flush with the surface of the helmet, they become easily snagged on paracord or the like, which either fouls the correct deployment of the parachute or leads to the beacon being inadvertently removed from the helmet. One other disadvantage is that, as the beacon is often positioned out of the wearers field of view, correct operation of the beacon via its control switches is difficult. An additional disadvantage is that, given the low profile of the beacon and the relatively large size of the battery used to power the beacon, the battery often occludes light emitted from different angles making it generally only visible from above.

SUMMARY OF THE INVENTION

In order to overcome the above and other drawbacks there is provided a light-emitting beacon for attachment to a helmet comprising a convex outer surface. The beacon comprises a beacon body comprising a translucent elongate carapace and a base wherein the carapace is generally dome like, wherein the carapace and base together define a hollow space therebetween and further wherein an outer surface of the base is concave and configured to receive the convex outer surface of the helmet, a power source comprising a battery positioned within the hollow space adjacent the base, and a printed circuit board assembly arranged within the hollow space between the carapace and the battery such that a first surface of the circuit board assembly faces the power source and a second surface of the circuit board assembly faces the carapace, the circuit board assembly further comprising a plurality of LEDs arranged on the second surface wherein a first of the LEDs emits a first light such that the first light is visible from a first lateral side of the carapace and a second of the LEDs emits a second light such that the second light is visible from a second lateral side of the carapace. In a particular embodiment, the printed circuit board assembly comprises a flexible printed circuit board.

There is also provided a light-activated beacon comprising a beacon body comprising a translucent elongate carapace and a base wherein the carapace is generally dome like, wherein the carapace and base together define a hollow space therebetween, a power source comprising a battery positioned within the hollow space adjacent the base, and a printed circuit board assembly comprising at least one printed circuit board arranged within the hollow space between the carapace and the battery such that an inner surface of the at least one printed circuit board faces the power source and an outer surface of the at least one printed circuit board faces the carapace, the at least one printed circuit board further comprising at least one LED activated or deactivated in response to light sensed by at least one of a plurality of photosensors arranged on the outer surface, wherein a first of the photosensors senses light shining on a first lateral side of the carapace and a second of the photosensors senses light shining on a second lateral side of the carapace.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

Figure 1B:
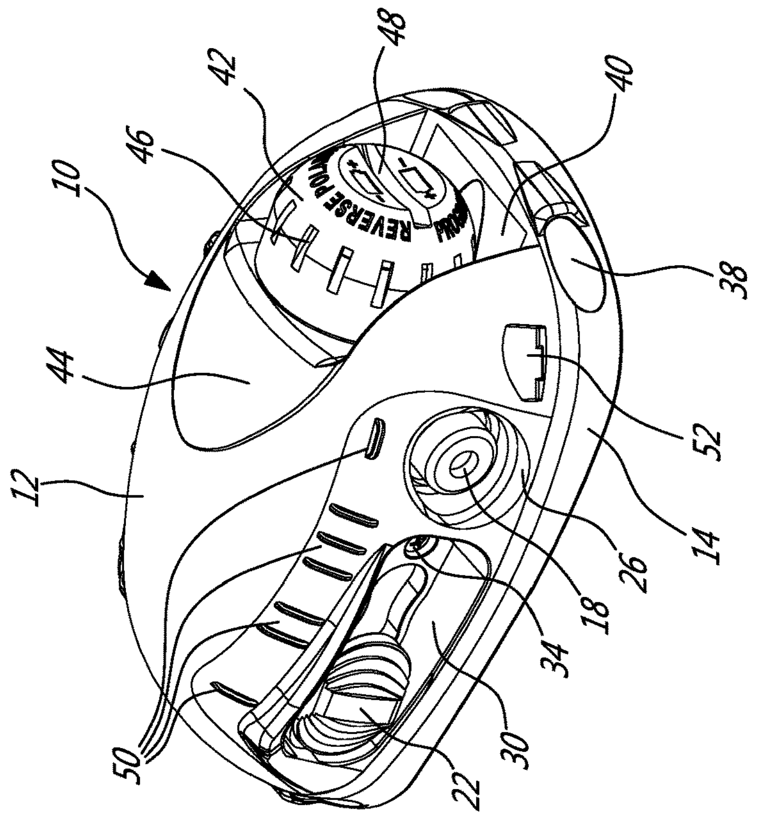
FIGS. 1A and 1B provide respectfully a left raised front perspective view and a right raised rear perspective view of a light emitting beacon in accordance with an illustrative embodiment of the present invention.
Figure 1A:
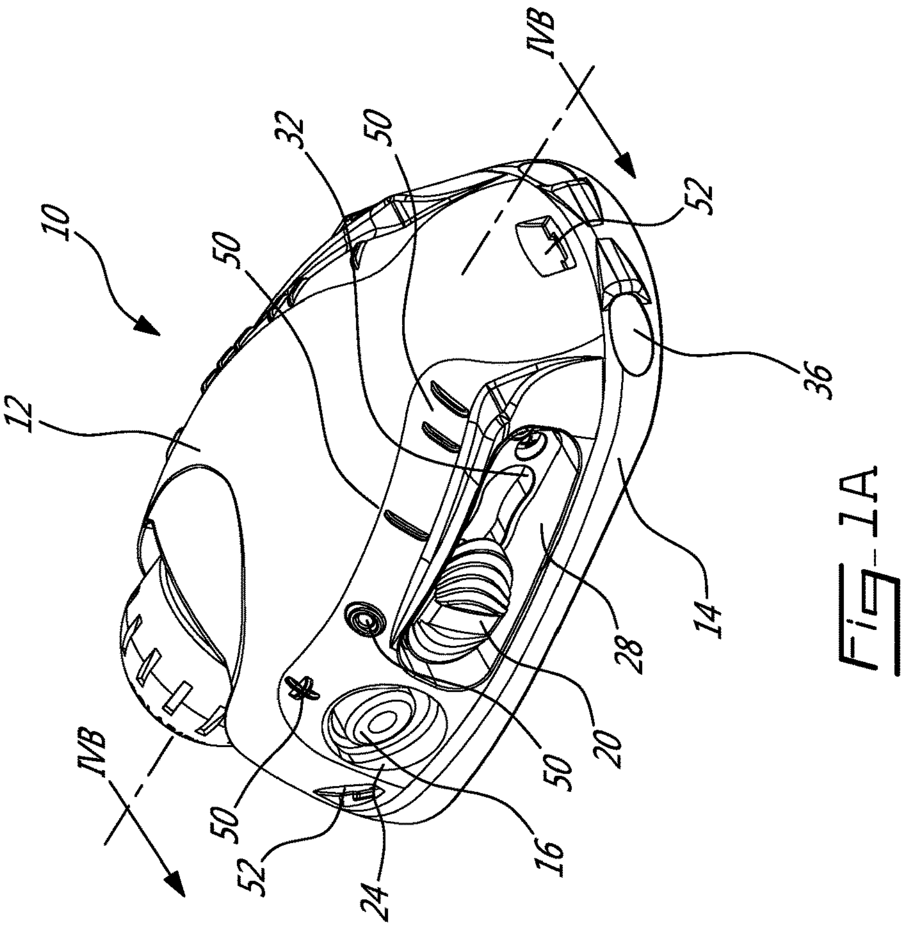

Referring now to FIGS. 1A and 1B a light-emitting beacon, generally referred to by the reference numeral 10, will now be described. The beacon 10 comprises a translucent or transparent carapace 12 secured to a base 14 and, as will be discussed in more detail below, light emitting elements (not shown) are housed. The light emitting elements are controlled via a combination of buttons 16, 18 and sliding actuators 20, 22. In this regard, a first of the buttons 16 is positioned in a first recess 24 on one side of the carapace 12 and a second of the buttons 18 is positioned in a second recess 26 on an opposite side of the carapace 12. In this regard, the buttons 16, 18 can be actuated simultaneously used together (for example using a thumb and an index finger, both not shown). The sliding actuators 22, 24 in respective recesses 28, 30 on opposite sides of the carapace 12 from each other. Each sliding actuator 22, 24 is positioned in a respective collar 32, 34 and such that it can slide generally in parallel to the length of the beacon 10. A lateral bore 36 is provided towards a forward end of the carapace 12 to receive para cord or rope or the like (not shown). An additional retaining strap receiving passage 38 is provided towards the rearward end of the carapace 12. A recess 40 is also provided in the rearward end of the carapace 12 which receives a threaded battery compartment cap 42 and such that the threaded cap 42 is below or substantially flush with an outer surface 44 of the carapace 12. The threaded cap 42 comprises a serrated outer surface 46 to improve gripping. Additionally, a groove 48 is formed in the end of the cap which is suitable for receiving a coin, screw driver, or knife blade or the like (not shown) to aid in opening and closing the threaded cap 42.

Still referring to FIG. 1, a series of raised features 50 are molded in the outer surface 46 of the carapace 12 adjacent each button 16, 18 and adjacent predetermined positions of the sliders 20, 22, to aid a user of the beacon 10 in correctly operating the beacon 10 when it is not readily visible, for example in conditions of low light or when the beacon 10 is positioned out of the user's field of view (for example on the user's head) and provide a recognizable tactile feedback as to the position one or other of the sliders 20, 22 is in. Additionally, a series of indentations 52 are molded in the outer surface 46 of the carapace 12 for, as will be discussed in more detail below, removeably engaging with an adaptor plate (not shown).

Figure 2:
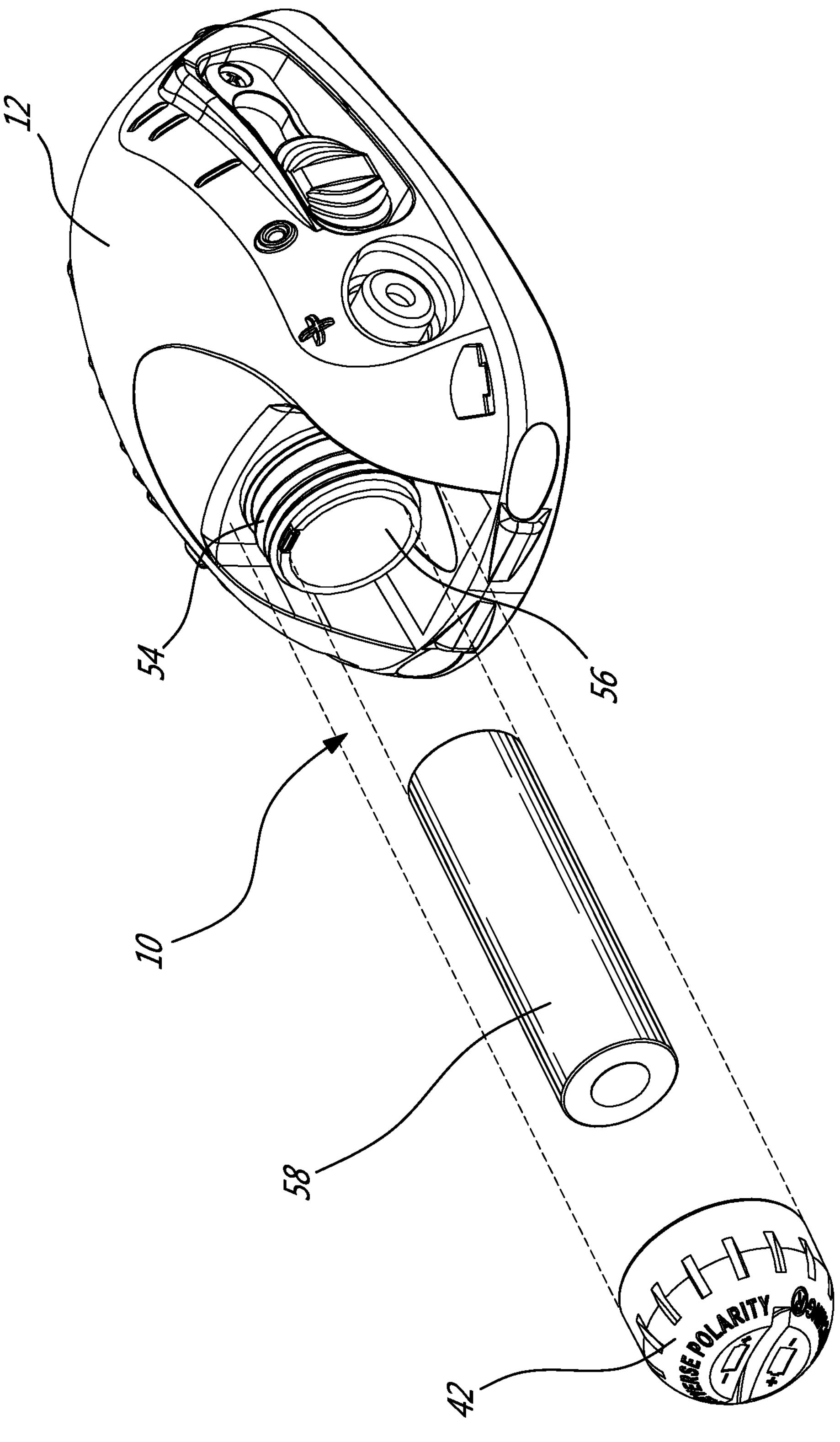
FIG. 2 provides a rear left perspective view with the battery removed in accordance with an illustrative embodiment of the present invention.

Referring now to FIG. 2, the threaded cap 42 covers a threaded opening 54 to a battery compartment 56 in the carapace 12. Removal of the threaded cap 42 allows a battery 58, illustratively an alkaline battery such as an AA type battery to be inserted via the threaded opening 54 into the battery compartment 56. In other embodiments the threaded opening 54 and battery compartment 56 can dimensioned to receive other types of alkaline batteries, such as an AAA type battery, or lithium batteries such as a CR123 type battery and their rechargeable variants, or other battery packs or rechargeable batteries of differing dimensions.

Figure 3B:
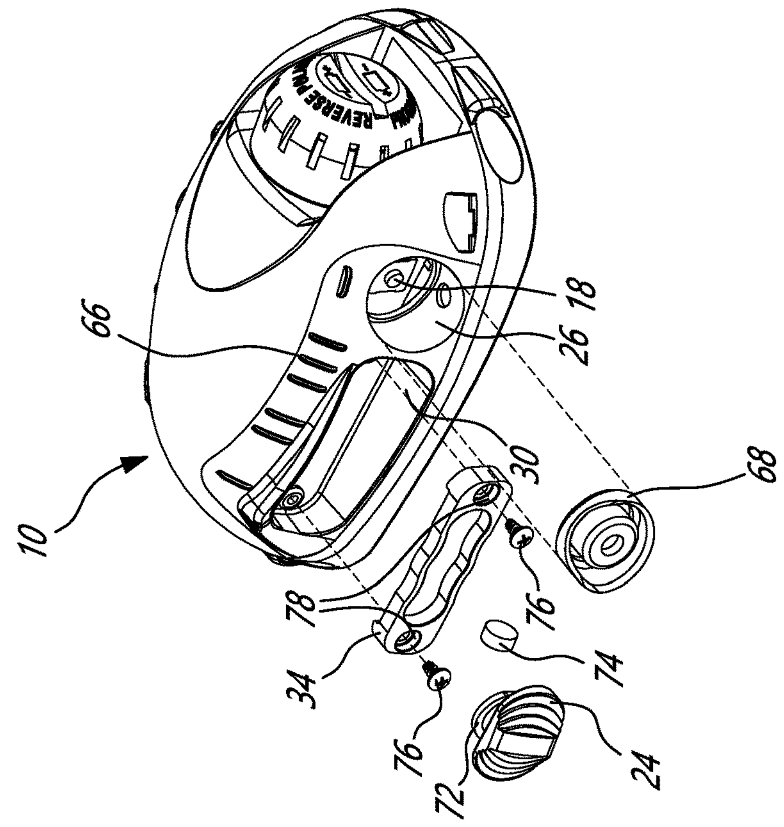
FIGS. 3A and 3B provide opposed raised side views of a beacon in accordance with an illustrative embodiment of the present invention.
Figure 3A:
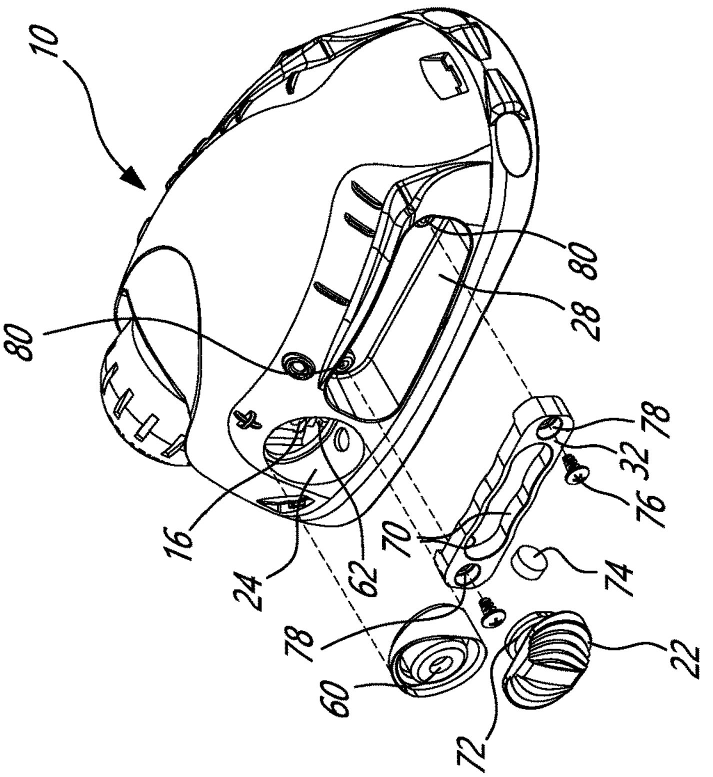

Referring now to FIGS. 3A and 3B, as discussed above, in order to enable and control the beacon 10 a pair of buttons 16, 18 and sliding actuators 20, 22 are provided. Advantageously, as the first button 16 is located on a side of the carapace 12 opposite from the second button 18, the first button 16 can be used in combination with the second button 18 to provide additional inputs or limit inadvertent activation or deactivation. For example, in one embodiment the first button 16 and the second button 18 must be depressed simultaneously in order to activate or deactivate the beacon 10. In another embodiment the first button 16 and the second button 18 are depressed simultaneously in order to change the wavelength of light emitted from light in the visible spectrum to light in a non-visible spectrum such as infrared or the like, and vice-versa. In still another embodiment the first button 16 and the second button 18 are depressed simultaneously in order to change the light emitted by the beacon from steady state to flashing. In still another embodiment the first button 16 and the second button 18 are depressed simultaneously for a period one (1) second will place the device in IR mode, two (2) seconds will place the device in visual mode and four (4) seconds or above will place the device in programming mode. In still another embodiment depressing the first button 16 alone increases an output intensity of the emitted light or IR and depressing the second button 18 alone decreases an output intensity of the emitted light or IR.

Still referring to FIGS. 3A and 3B, the first button 16 is positioned within the first recess 24 and covered using a first overmoulded flexible covering 60, or boot, of a soft malleable plastic or the like. The bottom of the recess 24 defines a first aperture 62 and such that the first button 16 is actuatable via the flexible boot 60. Similarly, the second button 18 is positioned within a second aperture 66 defined by the second recess 26 and protected using a second overmoulded covering 68, also of a soft flexible malleable plastic or the like.

Still referring to FIG. 3A, as discussed above the sliding actuators 20, 22 are secured within their respective recesses 28, 30 formed in the side of the carapace 12 adjacent the first button 16 by a respective one of a pair of collars 32, 34. In one embodiment, each collar 32, 34 comprises two opposed guides 70 which are profiled thereby providing tactile feedback and ensuring the slide actuators 20, 22 may be positioned in one of a plurality of discrete positions, illustratively three (3). The two opposed guides 70 are received in an annular ring 72 formed in each sliding actuator 20, 22 and such that each sliding actuator 20, 22 is able to slide along their respective opposed guides 70 along the length of their respective collars 32, 34. In order to interact with electronics (not shown) housed within the carapace 12, a magnet 74 is held within each of the sliding actuators 20, 22 for movement therewith and such that the magnetic field generated by the magnet 74 penetrates the carapace 12. The collars 32, 34 are retained within their respective recesses 28, 30 by pairs of self-tapping screws or the like 76 which are received via respective bores 78 in each collar 32, 34 into respective threaded holes 80.

Figure 4B:
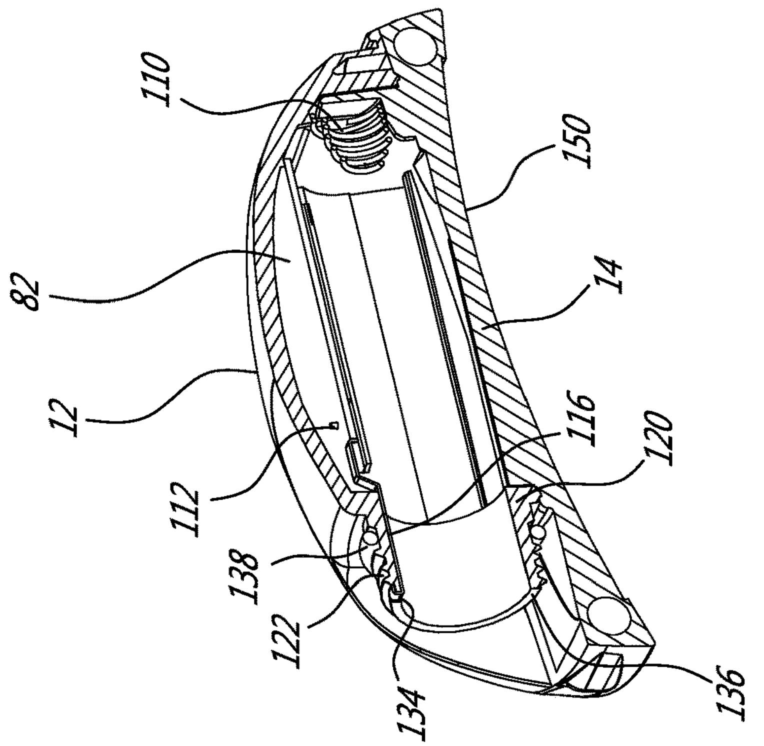
FIG. 4B provides a sectional view along 1VB-1VB in FIG. 1.
Figure 4A:
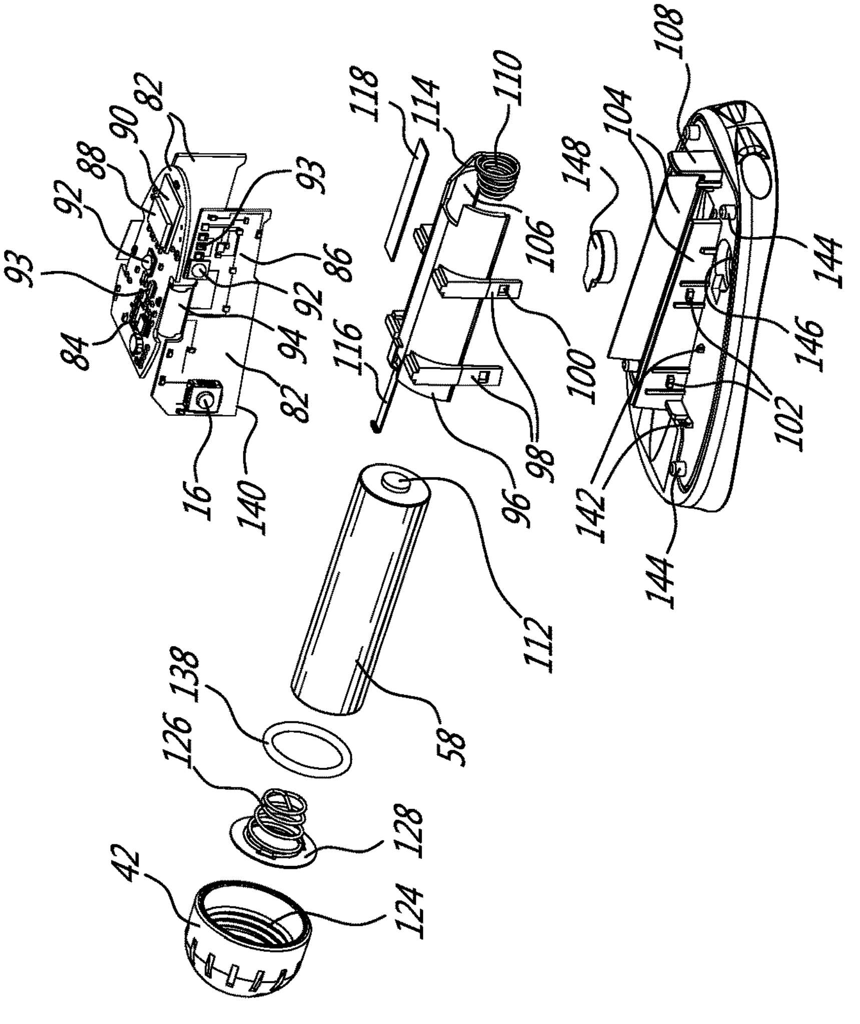
FIG. 4A provides an exploded view of a beacon without the carapace and in accordance with an illustrative embodiment of the present invention.

Referring now to FIGS. 4A and 4B, the carapace 12 houses a plurality of Printed Circuit Boards (PCBs) 82 onto which electronics 84 are mounted, for example using solder, connectors, semi-flex circuit or flex circuit, or the like, and interconnected by a plurality of traces 86. The electronics may comprise inter alia one or more of microprocessors 88, microcontrollers 90, light emitting devices LEDs 92 and photosensors 93. Electronics 84 on one of the PCBs 82 are interconnected with electronics 84 on the other PCBs 82 via the traces 86 and ribbon cables 94 or the like. In one embodiment the photosensors 93 provide a convenient means to introduce a customized sequence into the beacon 10, for example using an external light source or the like, and such that the LEDs 92 subsequently emit light according to the programmed sequence. This could be, for example, a particular sequence in Morse code, such as an SOS or the like. In another embodiment the photosensors 93 allow the beacon 10 to receive and react in response to an IFF type signal, for example as provided by a laser or the like (not shown) directed at the beacon 10, for example by directing the LEDs 92 to emit light in a predictable and confirmatory fashion on reception of the IFF type signal by the photosensors 93.

Still referring to FIGS. 4A and 4B, the base 14 together with a semi-tubular structure 96 forms a compartment for receiving the battery 58 therein as well as a support for the PCBs 82. The semi-tubular structure 96 comprises a plurality of legs 98 each comprising a slot 100 which engages a respective tab 102 on the base 14 and such that the semi-tubular structure 96 can be snap-fit to the base 14. In this regard the base 14 comprises a pair of opposed raised panels 104 the facing surfaces of which align with the inner surface 106 of the semi-tubular structure 96 to form the battery compartment when assembled. A closed end of the battery compartment formed by the semi-tubular structure 96 and the opposed raised panels 104 comprises a seat 108 which receives a conductive spring 110 and against which a first end 112 of the battery 58 is in contact during normal operation. In an alternative embodiment the spring 110 could be replaced by a conductive annular plate with a raised flexible tab (not shown). A first conductive rail 114 interconnects the conductive spring 110, and therefore the battery 58 with at least one (illustratively positive) trace on the PCBs 82. On assembly, the PCBs 82 are arranged over the battery compartment formed by the semi-tubular structure 96 and the opposed raised panels 104 and interconnected with the first conductive rail 112 and a second conductive rail 116. In this manner, light emitted by the LEDs 92 mounted on the PCBs 82 are not obscured by the battery 58. A cushioning spacer 118 is also provided between the central one of the PCBs 82 and an upper surface of the semi-tubular structure 96.

An open end of the battery compartment formed by the semi-tubular structure 96 and the opposed raised panels 104 comprises a collar 120 molded into the carapace 12 and comprising an outer thread 122. The collar 120 receives the battery compartment cap 42 which engages a mating inner thread 124 thereof. A conductive assembly comprising a conductive spring 126 and a conductive annular plate 128 is positioned within the cap 42 and such that on assembly it comes into contact with a second end 130 of the battery 58. In a particular embodiment the spring 126 and annular plate 128 could be replaced by an annular plate with flexible tab, not shown. A first end 132 of the second conductive rail 116 is in contact with at least one (illustratively negative) trace 86 on the PCBs 82 while a second end 134 laps over an outer edge 136 of the threaded collar 120 and such that, when the cap 42 is threaded snugly onto the collar 120, the second conductive rail 116 comes into contact with the conductive annular plate 128 thereby interconnecting the second end 130 of the battery 58 with the PCBs 82. An O-ring 138 is also provided about the collar 120 such that on assembly, the battery compartment is sealed thereby preventing the egress of dirt and moisture and the like.

Still referring to FIGS. 4A and 4B, the lower edges 140 of the two opposed PCBs 82 are held in place by raised tabs 142. Additionally, a plurality of posts 144 are provided that during assembly are bonded within respective holes (not shown) in the carapace 12. In a particular embodiment, an indentation 146 is provided in the base 14 for receiving a small motor 148, for example, which can be actuated to cause the beacon 10 to vibrate to provide haptic feedback. For example, in response to a change in mode or function, vibrating feedback can be provided, with the number or duration of vibrations indicative of a particular mode, or to indicate a low battery power or the like. Similarly, vibrating feedback can be provided in response to detection of a signal at one or other of the photo sensors 93, for example and IFF type signal as discussed above. An underside 150 of the base 14 is generally concave and such that it will sit snugly against a similarly curved surface.

Still referring to FIGS. 4A and 4B, in some embodiments the carapace 12 and base 14 are manufactured from the same relatively hard material such as polycarbonate or the like. Portions of the material may be translucent or opaque as required to achieve a desired illumination. For example, a translucent or transparent polycarbonate may be used to manufacture both the carapace 12 and base 14 and portions of the carapace 12 and base 14 covered with an opaque paint to achieve a desired illumination.

Still referring to FIGS. 4A and 4B, as the assembly may be subject to considerable impact or shock during use, for example when attached to the helmet of a paratrooper, in a particular embodiment the carapace 12 is manufactured from a relatively hard material such as polycarbonate or the like having a shore hardness of greater than about D80 and a flexural modulus at 23° C. according to ISO 178 of greater than about 2400 MPa. In a particular embodiment a clear polycarbonate is used to manufacture the carapace 12. In one embodiment the base 14 is manufactured from a softer shock absorbing material such as a thermoplastic elastomer (TPE) or the like having a shore hardness of less than about D70 and a flexural modulus at 23° C. according to ISO 178 of less than about 540 MPa. In a particular embodiment a thermoplastic polyurethane elastomer is used to manufacture the base 14. One particular advantage of some thermoplastic polyurethane elastomers is their ability to maintain elasticity in extreme cold, for example down to −90° C. or the like.

Still referring to FIGS. 4A and 4B, provision of a softer material between the relatively hard carapace 12 and, for example, a hard helmet provides an improved cushioning sandwich structure that absorbs shock, vibration and impact with the additional advantage that the flexibility of the base 14 allows the base 14 to conform to better fit the shape of the helmet. This reduces, for example breaking or fracturing on impact which is prevalent with previous designs. In both cases the carapace 12 may be joined to the base 14 in a hermetic seal using an ultrasonic welding procedure or adhesive or the like.

As discussed above, the beacon 10 can be secured to a helmet or the like using the lateral bore 36 and/or the retaining strap receiving passage 38. As the base 14 can be subject to considerable stress when attached to a helmet or the like, one additional advantage of using a softer elastomer is that the base 14 is able to give somewhat in response to such stresses. This provides for less wear on cord as well as reducing breakage of the base 14.

Still referring to FIGS. 4A and 4B, additionally, or alternatively, the base 14 may be overmoulded with a soft flexible skirt (not shown) manufactured from a flexible plastic or silicon rubber or the like, to fill in any residual gaps between the beacon 10 and the helmet.

Still referring to FIGS. 4A and 4B, as discussed above, one advantage of providing a plurality if PCBs 82 as disclosed is that the battery 58 does not occlude at least one of the LEDs 92 and such that at least one of the LEDs 92 is visible on either side of the battery 58, as well as above the battery 58. Similarly, the battery 58 does not occlude at least one of the photo sensors 93 and such that at least one of the photo sensors 93 is visible on either side of the battery 58, as well as above the battery 58.

Figure 5:
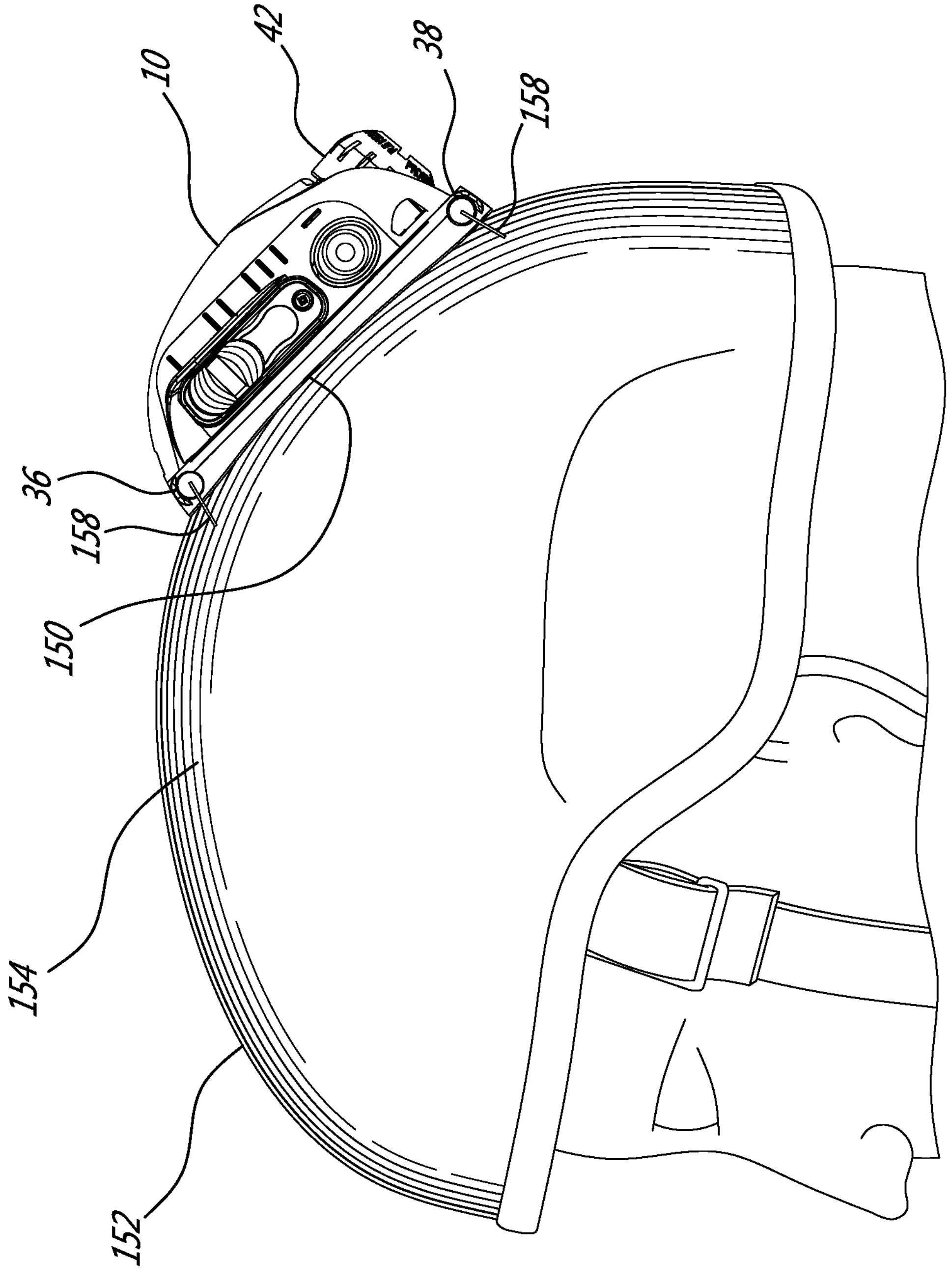
FIG. 5 provides a side plan view of a beacon mounted on a helmet and in accordance with an illustrative embodiment of the present invention.

Referring now to FIG. 5, the beacon 10 is suitable for mounting to a helmet 152 or the like. As discussed above, the underside 150 of the base 14 is generally concave and such that the curved outer surface 154 of the helmet 152 is received snugly against the underside 150. A flexible skirt (not shown) may also be provided that serves to seal the outer edge of the device 10 and provide a smooth transition between the helmet 152 and the device 10. As discussed above, the device 10 may be mounted using zip ties or paracord 158 which are engaged in respective ones of the lateral bores 36, 38. Together with the recessed battery compartment cap 42, this configuration helps ensure that the underside 150 of a suitably mounted device 10 will not snag on rope or paracords and the like, and such that, for example, the device 10 is inadvertently removed from the helmet 152.

Figure 6:
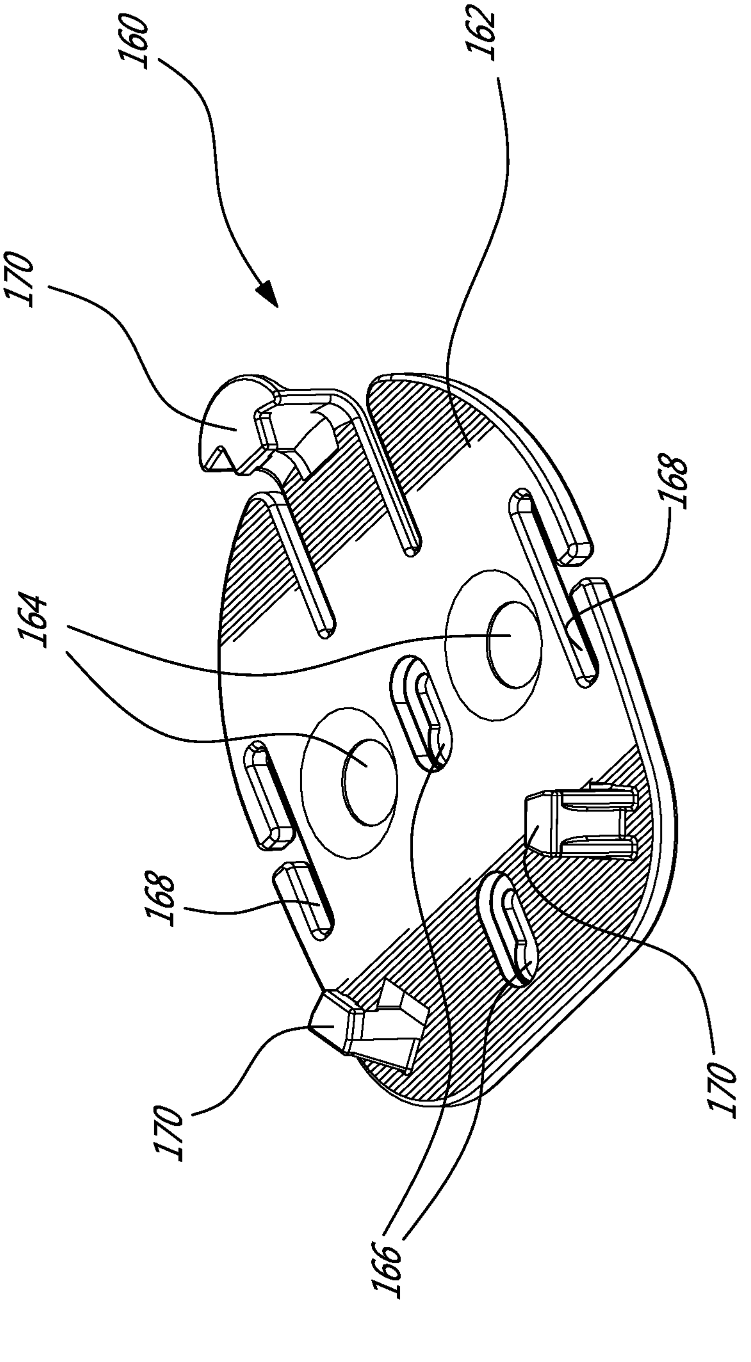
FIG. 6 provides an embodiment of a mounting plate for use with the beacon and in accordance with an illustrative embodiment of the present invention.

Referring now to FIG. 6 in addition to FIG. 1, an accessory mounting plate 160 is shown. The mounting plate 160 comprises a base 162 which can be securely mounted to a variety of objects. In this regard, the base comprises a pair of tapered apertures 164, for example for accepting tapered head bolts (not shown) or the like. Additionally, there is provided a pair of keyhole apertures 166, for example for releasable securing the mounting plate 160 to a wall or tree or the like. Also, there is provided a pair of slots 168 through which a belt or collar can be fed. The mounting plate 160 further comprises a trio of flexible grips 170 which engage respective one of the indentations 52 molded in the outer surface 46 of the carapace 12. As will now be apparent to a person of ordinary skill in the art, the device 10 may be snapped onto the mounting plate 160 between the three flexible grips 162.

Although the present invention has been described hereinabove by way of specific embodiments thereof, it can be modified, without departing from the spirit and nature of the subject invention as defined in the claims.

The invention claimed is:

1. A light-emitting beacon for attachment to a helmet comprising a convex outer surface, the beacon comprising:

a beacon body comprising an elongate carapace formed of a material permitting passage of light and a base wherein said carapace is generally dome like, wherein said carapace and base together define a hollow space therebetween and further wherein an outer surface of said base is concave and configured to receive the convex outer surface of the helmet;

a power source comprising a battery positioned within said hollow space adjacent said base; and a printed circuit board assembly arranged within said hollow space between said carapace and said battery, said printed circuit board assembly comprising a first portion and a second portion, each of said first portion and said second portion comprising a first flat surface facing said power source and a second surface opposite said first flat surface facing said carapace, wherein said first flat surface of said first portion is arranged opposing said first flat surface of said second portion, said first portion further comprising an outer edge arranged adjacent said base along a first side of said battery and said second portion comprising an outer edge arranged adjacent said base along a second side of said battery opposite said first side of said battery, a first LED arranged on said second surface of said first portion and a second LED arranged on said second surface of said second portion and such that said first LED emits a first light such that said first light is visible from a first lateral side of said carapace and said second LED emits a second light such that said second light is visible from a second lateral side of said carapace.

2. The light emitting beacon of claim 1, wherein said carapace is one of transparent and translucent and said base is opaque.

3. The light emitting beacon of claim 1, wherein said circuit board assembly further comprises a plurality of photosensors wherein a first of said photosensors receives light shining on said first lateral side of said carapace and a second of said photosensors receives light shining on said second lateral side of said carapace.

4. The light emitting beacon of claim 1, wherein said carapace is manufactured from a polycarbonate.

5. The light emitting beacon of claim 1, wherein said base is manufactured from a thermoplastic elastomer (TPE).

6. The light emitting beacon of claim 1, wherein said printed circuit board assembly comprises a plurality of circuit boards, two of said circuit boards positioned on opposing sides of said battery.

7. The light emitting beacon of claim 1, wherein said printed circuit board assembly comprises a semi-flexible or flexible printed circuit board.

8. The light emitting beacon of claim 1, further comprising a plurality of switches for activating the beacon, at least one switch on each opposing lateral side of said carapace, said carapace dimensioned and said switches positioned such that said switches may be actuated simultaneously with one hand.

9. The light emitting beacon of claim 1, further comprising a battery compartment arranged generally along a long axis of said carapace within said hollow space and sized for receiving a cylindrical battery of a standard dimension through a recessed circular battery compartment opening, said opening positioned towards a rear of said carapace and comprising a male thread on an outer surface thereof; a threaded cap covering said battery compartment opening, wherein said cap comprises a female thread complementary to said male thread, said cap dimensioned to fit into said opening such that when said cap is secured onto said opening by engaging said male thread and said female thread, said cap is positioned substantially at or below an outer surface of said carapace and further wherein said printed circuit board assembly is positioned between said battery compartment and said carapace.

10. A light-activated beacon comprising:

a beacon body comprising an elongate carapace formed of a material permitting passage of light and a base wherein said carapace is generally dome like, wherein said carapace and base together define a hollow space therebetween;

a power source comprising a battery positioned within said hollow space adjacent said base;

a printed circuit board assembly arranged within said hollow space between said carapace and said battery;

wherein said printed circuit board assembly comprises a first portion and a second portion;

wherein each of said first portion and said second portion comprises a first flat surface facing said power source and a second surface opposite said first flat surface facing said carapace;

wherein each of said first flat surfaces faces said battery and each of said second surfaces faces said carapace;

wherein at least one LED arranged on said second surfaces is configured for activation or deactivation in response to light sensed by at least one of a plurality of photosensors arranged on said second surfaces;

wherein a first of said photosensors senses light shining on a first lateral side of said carapace and a second of said photosensors senses light shining on a second lateral side of said carapace;

wherein said printed circuit board assembly comprises a plurality of circuit boards, two of said circuit boards positioned on opposing sides of said battery.

11. The light-activated beacon of claim 10, wherein said carapace is one of transparent and translucent and said base is opaque.

12. The light-activated beacon of claim 10, wherein said carapace is manufactured from a polycarbonate.

13. The light-activated beacon of claim 10, wherein said base is manufactured from a thermoplastic elastomer (TPE).

14. The light-activated beacon of claim 10, further comprising a plurality of switches for activating or deactivating the at least one LED, at least one switch on each opposing lateral side of said carapace, said carapace dimensioned and said switches positioned such that said switches may be actuated simultaneously with one hand.

15. A light-emitting beacon for attachment to a helmet comprising a convex outer surface, the beacon comprising:

a beacon body comprising an elongate carapace formed of a material permitting passage of light and a base wherein said carapace is generally dome like, wherein said carapace and base together define a hollow space therebetween and further wherein an outer surface of said base is concave and configured to receive the convex outer surface of the helmet;

a power source comprising a battery positioned within said hollow space adjacent said base;

a printed circuit board assembly arranged within said hollow space between said carapace and said battery such that a first surface of said circuit board assembly faces said power source and a second surface of said circuit board assembly opposite said first surface faces said carapace, said circuit board assembly further comprising a plurality of LEDs arranged on said second surface wherein a first of said LEDs emits a first light such that said first light is visible from a first lateral side of said carapace and a second of said LEDs emits a second light such that said second light is visible from a second lateral side of said carapace; and wherein said printed circuit board assembly comprises a plurality of circuit boards, two of said circuit boards positioned on opposing sides of said battery.

16. The light emitting beacon of claim 15, wherein said plurality of printed circuit boards comprises a semi-flexible or flexible printed circuit board.

17. A light-activated beacon comprising:

a beacon body comprising an elongate carapace formed of a material permitting passage of light and a base wherein said carapace is generally dome like, wherein said carapace and base together define a hollow space therebetween;

a power source comprising a battery positioned within said hollow space adjacent said base;

a printed circuit board assembly arranged within said hollow space between said carapace and said battery;

wherein said printed circuit board assembly comprises a first portion and a second portion;

wherein each of said first portion and said second portion comprises a first flat surface facing said power source and a second surface opposite said first flat surface facing said carapace;

wherein each of said first flat surfaces faces said battery and each of said second surfaces faces said carapace;

wherein at least one LED arranged on said second surfaces is configured for activation or deactivation in response to light sensed by at least one of a plurality of photosensors arranged on said second surfaces;

wherein a first of said photosensors senses light shining on a first lateral side of said carapace and a second of said photosensors senses light shining on a second lateral side of said carapace;

wherein said printed circuit board assembly comprises a semi-flexible or flexible printed circuit board.

18. A light-activated beacon comprising:

a beacon body comprising an elongate carapace formed of a material permitting passage of light and a base wherein said carapace is generally dome like, wherein said carapace and base together define a hollow space therebetween;

a power source comprising a battery positioned within said hollow space adjacent said base;

a printed circuit board assembly arranged within said hollow space between said carapace and said battery;

wherein said printed circuit board assembly comprises a first portion and a second portion;

wherein each of said first portion and said second portion comprises a first flat surface facing said power source and a second surface opposite said first flat surface facing said carapace;

wherein each of said first flat surfaces faces said battery and each of said second surfaces faces said carapace;

wherein at least one LED arranged on said second surfaces is configured for activation or deactivation in response to light sensed by at least one of a plurality of photosensors arranged on said second surfaces;

wherein a first of said photosensors senses light shining on a first lateral side of said carapace and a second of said photosensors senses light shining on a second lateral side of said carapace;

further comprising a battery compartment arranged generally along a long axis of said carapace within said hollow space and sized for receiving a cylindrical battery of a standard dimension through a recessed circular battery compartment opening, said opening positioned towards a rear of said carapace and comprising a male thread on an outer surface thereof; a threaded cap covering said battery compartment opening, wherein said cap comprises a female thread complementary to said male thread, said cap dimensioned to fit into said opening such that when said cap is secured onto said opening by engaging said male thread and said female thread, said cap is positioned substantially at or below an outer surface of said carapace and further wherein said printed circuit board assembly is positioned between said battery compartment and said carapace.

* * * * *